(12) United States Patent
Li et al.

(10) Patent No.: US 9,367,918 B2
(45) Date of Patent: Jun. 14, 2016

(54) MULTI-VIEW STEREO SYSTEMS AND METHODS FOR TUBE INVENTORY IN HEALTHCARE DIAGNOSTICS

(75) Inventors: Gang Li, Princeton, NJ (US); Yakup Genc, Dayton, NJ (US); Siddharth Ram Chhatpar, Brookline, MA (US); Sandeep M. Naik, Mead, NJ (US); Roy Barr, Delaware, NJ (US); Daniel Sacco, Hackettstown, NJ (US); Alexander Gelbman, Florham Park, NJ (US)

(73) Assignee: Siemens Heathcare Diagnostics Inc., Tarrytown, NY (US)

( * ) Notice: Subject to any disclaimer, the term of this patent is extended or adjusted under 35 U.S.C. 154(b) by 410 days.

(21) Appl. No.: 14/005,138

(22) PCT Filed: Feb. 29, 2012

(86) PCT No.: PCT/US2012/027100
§ 371 (c)(1),
(2), (4) Date: Nov. 20, 2013

(87) PCT Pub. No.: WO2012/125291
PCT Pub. Date: Sep. 20, 2012

(65) Prior Publication Data
US 2014/0063241 A1 Mar. 6, 2014

Related U.S. Application Data

(60) Provisional application No. 61/452,805, filed on Mar. 15, 2011.

(51) Int. Cl.
*G06T 7/00* (2006.01)
*H04N 7/18* (2006.01)
(52) U.S. Cl.
CPC ............... *G06T 7/0044* (2013.01); *G06T 7/001* (2013.01); *G06T 7/0008* (2013.01); *G06T 7/0046* (2013.01); *H04N 7/18* (2013.01); *G06T 2207/30108* (2013.01)

(58) Field of Classification Search
CPC ..... G06T 7/0044; G06T 7/0008; G06T 7/001; G06T 7/0046; H04N 7/18
See application file for complete search history.

(56) References Cited

U.S. PATENT DOCUMENTS

| 6,741,757 B1 * | 5/2004 | Torr | G06K 9/00154 |
| | | | 382/285 |
| 2002/0199164 A1 * | 12/2002 | Sengupta | G06K 9/32 |
| | | | 382/278 |
| 2007/0078466 A1 * | 4/2007 | Bodduluri | A61B 17/32053 |
| | | | 606/133 |

(Continued)

OTHER PUBLICATIONS

Gang Li et al., "Exploiting Occluding Contours for Real-Time Tracking: A Unified Approach," Proceedings of IEEE International Conference on Computer Vision (ICCV), Rio de Janeiro, Brazil, Oct. 2007.*

(Continued)

*Primary Examiner* — Thai Tran
*Assistant Examiner* — Christopher T Braniff (57) ABSTRACT

A multi-view stereo approach generates an inventory of objects located on an object holder. An object may be a sample tube and an object holder may be a tube rack as used in lab automation for healthcare diagnostics. A processor performs 3D tracking of the object holder and the geometric analysis of multiple images generated by a calibrated camera. A homography mapping between images is utilized to warp a second image to a viewpoint of a first image. Plane induced parallax causes a normalized cross-correlation score between the first image and the warped second image of a location on the holder that has an object that is significantly different from a normalized cross-correlation score of a location that has not an object and enables the processor to infer tube inventory and absence or presence of a tube at a location in a rack.

18 Claims, 9 Drawing Sheets

(56) References Cited

U.S. PATENT DOCUMENTS

2008/0246848 A1* 10/2008 Tsubaki ............... G06T 7/20
348/208.4
2009/0324032 A1* 12/2009 Chen ............ G01N 35/00732
382/128

OTHER PUBLICATIONS

Eshel R et al.: "Homography based multiple camera detection and tracking of people in a dense crowd", Computer Vision and Pattern Recognition, 2008. CVPR 2008. IEEE Conference on, IEEE, Piscataway, NJ, USA, Jun. 23, 2008, pp. 1-8, XP031297097, ISBN: 978-1-4244-2242-5, abstract sections 1, 3.1.
Yanghai Tsin et al: "Learn to Track Edges", Computer Vision, 2007. ICCV 2007. IEEE 11th International Conference 0 N, IEEE, PI, Oct. 1, 2007, pp. 1-8, XP0311194526, ISBN: 978-1-4244-1630-1, the whole document.
PCT International Search Report and Written Opinion dated Jun. 5, 2012 (13 Pages).

* cited by examiner

1501
Generate with one of one or more calibrated cameras in a first pose relative to an object holder a first image of the object holder and with one of one or more calibrated cameras in a second pose relative to the object holder a second image of the object holder which holds a plurality of objects

1503
Transform with a processor the second image with a homography to a plane in the first image as a warped image

1505
Determine with the processor a normalized cross correlation between pairs of corresponding pixels in the first and the warped image

1507
Determine with the processor an absence of an object in the object holder, based on the normalized cross correlation

FIG. 14

MULTI-VIEW STEREO SYSTEMS AND METHODS FOR TUBE INVENTORY IN HEALTHCARE DIAGNOSTICS

STATEMENT OF RELATED CASES

The present application claims priority to and the benefit of U.S. Provisional Patent Application Ser. No. 61/452,805 filed on Mar. 15, 2011, which is hereby incorporated by reference.

TECHNICAL FIELD

The present invention relates to machine vision in laboratory automation applying multi-view stereographic geometry.

BACKGROUND

Robotic arms are used in laboratory automation, for instance in the processing of tubes such as sample tubes as used in healthcare diagnostics. Traditionally, the robotic arm is equipped with a bar-code reader. In order to operate tube samples, the robotic arm will try to grab a tube at a given location and it uses a mechanical sensor to determine whether there is a tube or not, which is basically "seeing by touching".

This "seeing by touching" operation requires a mechanical step which extends the total time for locating a tube in an inventory of tubes. Deciding the presence of a tube at a certain location in an inventory of tubes can take place much faster and with higher accuracy when only images are used and the robotic arm does not have to move first to an assumed tube to determine the existence of a tube in a location. The use of multiple images in a multi-view machine vision approach is believed to significantly improve a performance of a robotic arm in processing sample tubes in healthcare diagnostic. Such an approach is believed not to be currently available.

Accordingly, novel and improved multi-view stereo systems and methods for tube inventory in healthcare diagnostics are required.

SUMMARY

In accordance with an aspect of the present invention, methods and systems are provided for detection of a presence or an absence of an object in an object holder by applying image processing based on correlating an image of the object holder containing objects taken from a first position with a homography of an image of the object holder containing objects taken from a second position.

In accordance with an aspect of the present invention an object is a sample tube and an object holder is a rack that holds sample tubes.

In accordance with an aspect of the present invention a method is provided for determining with one or more calibrated cameras an inventory of a plurality of objects located in an object holder, each object having a first portion located in a first plane in space and a second portion not located in the first plane, comprising generating by the one or more calibrated cameras a first image of the plurality of objects representing a first pose relative to the object holder and a second image of the plurality of objects representing a second pose relative to the object holder, the processor transforming the second image to a warped image with a homography that maps each scene point in the first plane in the second image to a corresponding scene point in the first plane of the first image, the processor generating a cross-correlation between the first image and the warped image and the processor determining an absence or a presence of an object at a location of the object holder.

In accordance with a further aspect of the present invention a method is provided, wherein the object is a sample tube and the object holder is a tube rack.

In accordance with yet a further aspect of the present invention a method is provided, wherein the one or more calibrated cameras are attached to a robotic arm.

In accordance with yet a further aspect of the present invention a method is provided, wherein the first and second poses are determined by edge-based three-dimensional tracking of the rack relative to the one or more calibrated cameras.

In accordance with yet a further aspect of the present invention a method is provided, wherein a relative pose between the rack and the one or more calibrated cameras is expressed as: $su_i = K(R_i X + T_i)$, wherein $X = (X, Y, Z)^T$ is any scene point on the rack, $u = (u, v, 1)^T$ is its image point represented in homogeneous coordinates, K is an internal calibration matrix and s is a scalar.

In accordance with yet a further aspect of the present invention a method is provided, wherein the homography is determined from the first and the second pose of one of the one or more calibrated cameras relative to the object holder.

In accordance with yet a further aspect of the present invention a method is provided, further comprising tracking a position of the object holder relative to the one or more cameras by applying a computer-aided-design (CAD) model of the object holder.

In accordance with yet a further aspect of the present invention a method is provided, wherein the first plane is the rack's top plane.

In accordance with yet a further aspect of the present invention a method is provided, further comprising the processor comparing the cross-correlation with a corresponding view of a computer-aided-design (CAD) model of the object holder.

In accordance with yet a further aspect of the present invention a method is provided, wherein the cross-correlation of a pixel $(u_0, v_0)$ in an image $I_i$ is a normalized cross-correlation (NCC) evaluated by the processor from an expression $$NCC(u_0, v_0) = \frac{\sum_{(u,v) \in N(u_0,v_0)} (I_i(u,v) - \bar{I}_i)(f_{H_{ji}}(I_j)(u,v) - f_{H_{ji}}^-(I_j))}{\left( \sum_{(u,v) \in N(u_0,v_0)} (I_i(u,v) - \bar{I}_i)^2 \sum_{(u,v) \in N(u_0,v_0)} (f_{H_{ji}}(I_j)(u,v) - f_{H_{ji}}^-(I_j))^2 \right)^{\frac{1}{2}}},$$

wherein $\bar{I}_i$ is a mean within a neighborhood window around $(u_0, v_0)$ in image $I_i$, $f_{H_{ji}}(I_j)(u,v)$ is a warped j-th image using a homography $H_{ji}$, $f_{H_{ji}}^-(I_j)$ is a mean within a neighborhood window in image $f_{H_{ji}}(I_j)(u,v)$ of a same size as around $(u_0, v_0)$, and $N(u_0, v_0)$ is a neighborhood around $(u_0, v_0)$.

In accordance with another aspect of the present invention a system is provided to determine with a calibrated camera an inventory of a plurality of objects located in an object holder, each object having a first portion located in a first plane in space and a second portion not located in the first plane, comprising a memory to store data including instructions, a processor enabled to execute instructions to perform the steps determining a first and a second pose of the calibrated camera relative to the object holder, receiving from the calibrated camera a first image data of the plurality of objects with the calibrated camera in the first pose and a second image of the plurality of objects with the calibrated camera in the second pose, transforming the second image to a warped image with a homography that maps each scene point in the first plane in the second image to a corresponding scene point in the first plane of the first image generating a cross-correlation between the first image and the warped image and determining an absence or a presence of an object at a location of the object holder.

In accordance with yet another aspect of the present invention a system is provided, wherein the object is a sample tube and the object holder is a tube rack.

In accordance with yet another aspect of the present invention a system is provided, wherein the calibrated camera is attached to a robotic arm.

In accordance with yet another aspect of the present invention a system is provided, wherein the first and second pose are determined by edge-based three-dimensional tracking of the rack relative to the calibrated camera.

In accordance with yet another aspect of the present invention a system is provided, wherein a relative pose between the rack and the calibrated camera is expressed as: $su_i = K(R_i X + T_i)$, wherein $X = (X,Y,Z)^T$ is any scene point on the rack, $u = (u, v, 1)^T$ is its image point represented in homogeneous coordinates, K is an internal calibration matrix and s is a scalar.

In accordance with yet another aspect of the present invention a system is provided, wherein the homography is determined from the first and the second pose of the calibrated camera relative to the object holder.

In accordance with yet another aspect of the present invention a system is provided, wherein the homography is determined from predetermined points in the first plane.

In accordance with yet another aspect of the present invention a system is provided, wherein the first plane is the rack's top plane.

In accordance with yet another aspect of the present invention a system is provided, wherein the processor further enabled to perform comparing the cross-correlation with a corresponding view of a computer-aided-design (CAD) model of the object holder.

In accordance with yet another aspect of the present invention a system is provided, wherein the cross-correlation of a pixel $(u_0, v_0)$ in an image $I_i$ is a normalized cross-correlation NCC evaluated by the processor from an expression $$NCC(u_0, v_0) = \frac{\sum_{(u,v) \in N(u_0,v_0)} (I_i(u,v) - \bar{I}_i)(f_{H_{ji}}(I_j)(u,v) - \bar{f}_{H_{ji}}(I_j))}{\left( \sum_{(u,v) \in N(u_0,v_0)} (I_i(u,v) - \bar{I}_i)^2 \sum_{(u,v) \in N(u_0,v_0)} (f_{H_{ji}}(I_j)(u,v) - \bar{f}_{H_{ji}}(I_j))^2 \right)^{\frac{1}{2}}},$$

wherein $\bar{I}_i$ is a mean within a neighborhood window around $(u_0, v_0)$ in image $I_i$, $f_{H_{ji}}(I_j)(u,v)$ is a warped j-th image using a homography $H_{ji}$, $\bar{f}_{H_{ji}}(I_j)$ is a mean within a neighborhood window in image $f_{H_{ji}}(I_j)(u,v)$ of a same size as around $(u_0, v_0)$, and $N(u_0, v_0)$ is a neighborhood around $(u_0, v_0)$.

DESCRIPTION

Traditionally, a robotic arm in healthcare diagnostics operates in a "seeing by touching" mode for locating tubes in an inventory. In-vitro diagnostics such as immunodiagnostics is an important emerging area in healthcare. The diagnostic machines usually have robotic arms to operate fluid samples in tubes. Therefore, efficiently finding tubes is a critical performance factor. Traditionally, the robotic arm is equipped with a bar-code reader but no camera.

In accordance with an aspect of the present invention, a camera is attached to the robotic arm and multiple images are captured as the robotic arm moves to different locations. In accordance with an aspect of the present invention these multiple images are then analyzed and tube inventory is inferred using multi-view stereo geometry, effectively achieving "seeing by looking at".

Figure 1:
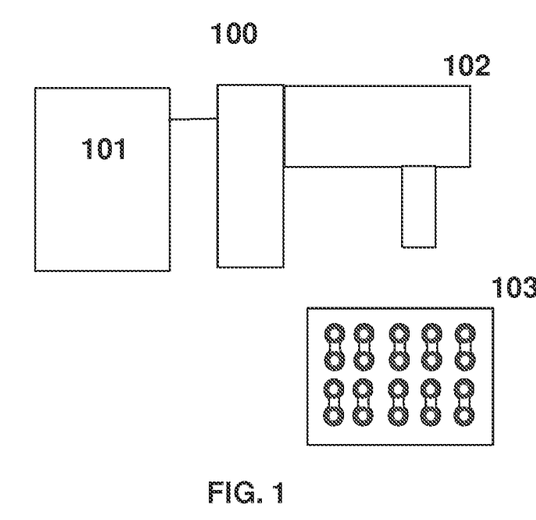
FIGS. 1-3 illustrates a robotized processing system for sample tubes.
Figure 2:
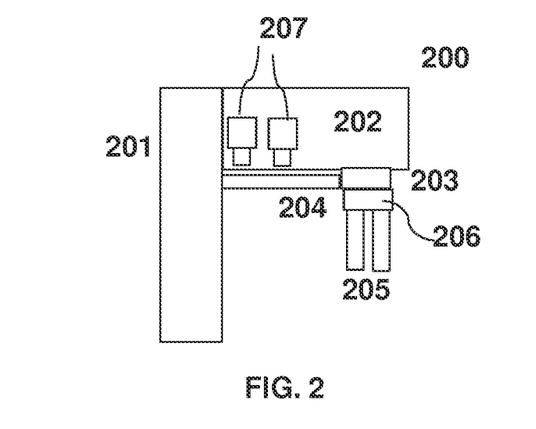

FIG. 1 illustrates in diagram a diagnostic machine 100 including a computer 101 with a processor connected to a robotic arm 102 to manipulate tubes placed in a tube rack 103. FIG. 2 shows an image of a robotic arm 200 with a vertically movable and rotatable part 201 with attached a horizontal arm 202. In the arm 202 is a horizontal rail 204 with a motor that can move a gripper assembly 203 inward and outward of the arm. The gripper assembly 203 includes a set of grippers 205 which can be open and closed by a motor 206. Included in 203 is a motor that can rotate 203 around a vertical axis. This and other embodiments of a robotic arm are known and are controlled by a computer and are able to lower a gripper at an identified location to grip and lift a tube from a rack or in reverse place a tube on an identified open space on a rack.

In accordance with an aspect of the present invention at least one camera 207 is provided to view a tube rack substantially from above. As illustrated by 207 in FIG. 2, one may use one camera to take two images wherein the one camera has to assume two different poses. In one embodiment of the present invention two calibrated cameras 207 are used, each having a different pose relative to the rack, to generate two images. It will become clear from further explanation below why the at least one camera is required to view a tube rack substantially from above. Because, as will be explained below, at least two images of a rack are required, it is possible to apply two or more cameras to take at least two images of a tube rack from above, each of two calibrated cameras generating one of the two required images for instance. In one embodiment of the present invention, one camera is attached to the robotic arm to create images of a rack. In one embodiment of the present invention, at least two cameras are attached to the robotic arm to create images of a rack.

In one embodiment of the present invention the at least one camera is attached to a separate moving mechanism separate from the robotic arm that manipulates the tubes. In one embodiment of the present invention two or more cameras are movable independent of the robotic arm.

In one embodiment of the present invention a plurality of cameras is fixed relative to a position of a rack. One moves with a mechanism the rack under the fixed cameras, and have a processor based on images and in accordance with various aspects of the present invention decide the presence or absence of a tube in the rack and then move the rack with the mechanism to a robotic arm station to perform required tube manipulation. This can be achieved by calibrating the operating space of the robotic arm with the space of the cameras. One can thus have different phases or stations: first phase of inventory determination with a plurality of cameras in one station followed in a second phase by robotic arm efforts to place or lift tubes in or out of a rack in a next station.

Figure 3:
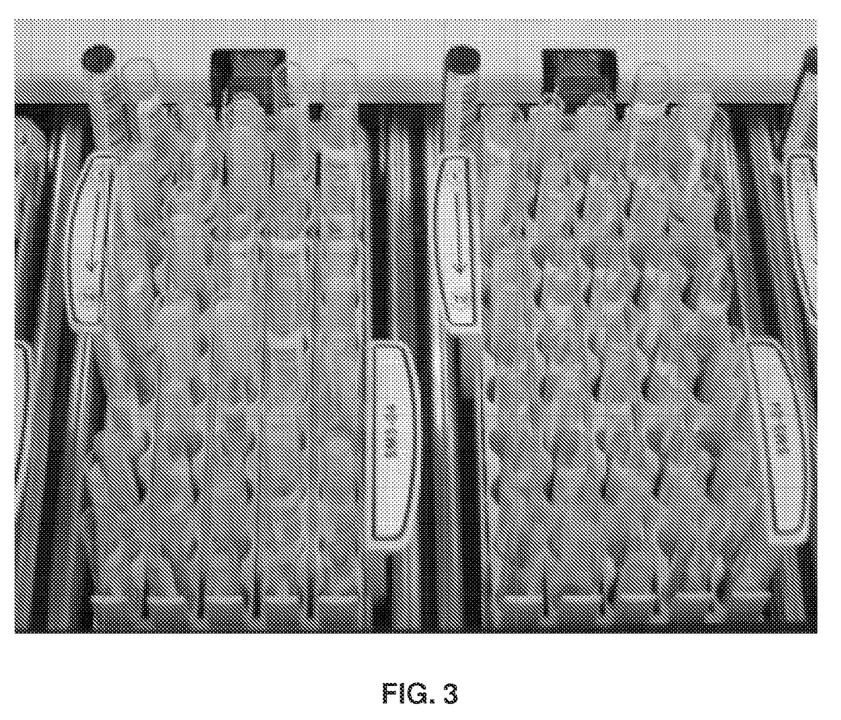

FIG. 3 is an image of tube racks where from inventory needs to be inferred.

The robotic arm can be positioned at specific positions by controlling its encoder. In accordance with an aspect of the present invention a camera which is attached to the robotic arm is moved to multiple positions to capture the input images for multi-view stereo. In accordance with an aspect of the present invention 3D tracking or pose estimation of the rack is performed in each image. This step is necessary for the precise localization of the rack for each viewpoint. Next, in accordance with an aspect of the present invention and based on multi-view geometry a homography mapping between each pair of images is derived and the second one is warped to the viewpoint of the first one. In accordance with a further aspect of the present invention, cross correlation which is preferably normalized cross correlation is used between the first image and the warped second image to infer whether each rack hole is occupied by a tube or not.

3D Tracking

Model-based 3D tracking of rigid objects is a well studied topic in computer vision and is for instance described in "[1]. Lepetit, V., Fua, P.: Monocular model-based 3D tracking of rigid objects: A survey. Foundations and Trends in Computer Graphics and Vision 1 (2005)" and "[2]. Drummond. T., Cipolla, R.: Real-time visual tracking of complex structures. IEEE Transactions on Pattern Analysis and Machine Intelligence 24 (2002) 932-946." Given a calibrated camera i.e. its internal parameters (such as focal length, aspect ratio, principal point, and distortion) have been determined offline, and a known 3D object in a scene, these techniques find out the pose of the camera with respect to the object through optimization. In accordance with an aspect of the present invention, an edge-based 3D tracking method as described in "[3] Li, G., Tsin, Y., Genc, Y.: Exploiting occluding contours for real-time 3D tracking: A unified approach. In: Proc. IEEE International Conference on Computer Vision. (2007)" is applied to localize the rack in multiple images. 3D model edges are extracted from the CAD model of the rack.

The result of the step is the relative pose between the rack coordinate system and the camera coordinate system, i.e. rotation $R_i$ and translation $T_i$ for the i-th image.

$$su_i = K(R_i X + T_i) \quad (1)$$

where $X=(X,Y,Z)^T$ is any scene point on the rack, $u=(u,v,1)^T$ is its image point represented in homogeneous coordinates, K is the internal calibration matrix and it is determined offline, and s is a scalar.

Figure 4:
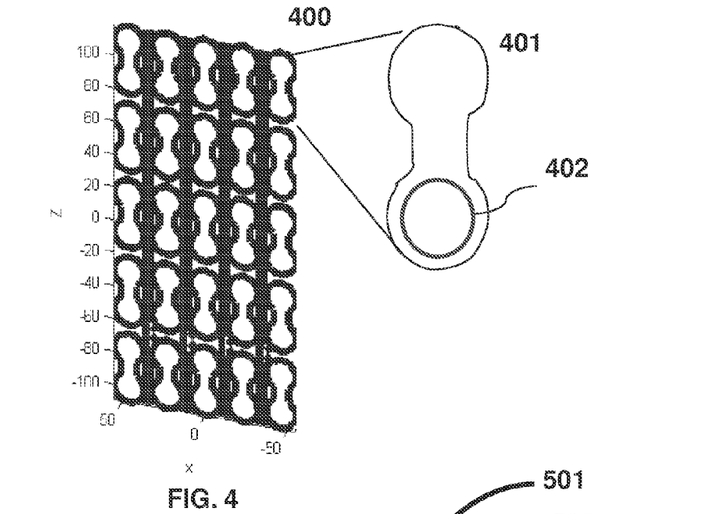
FIG. 4 illustrates a CAD model of a tube rack.
Figure 5:
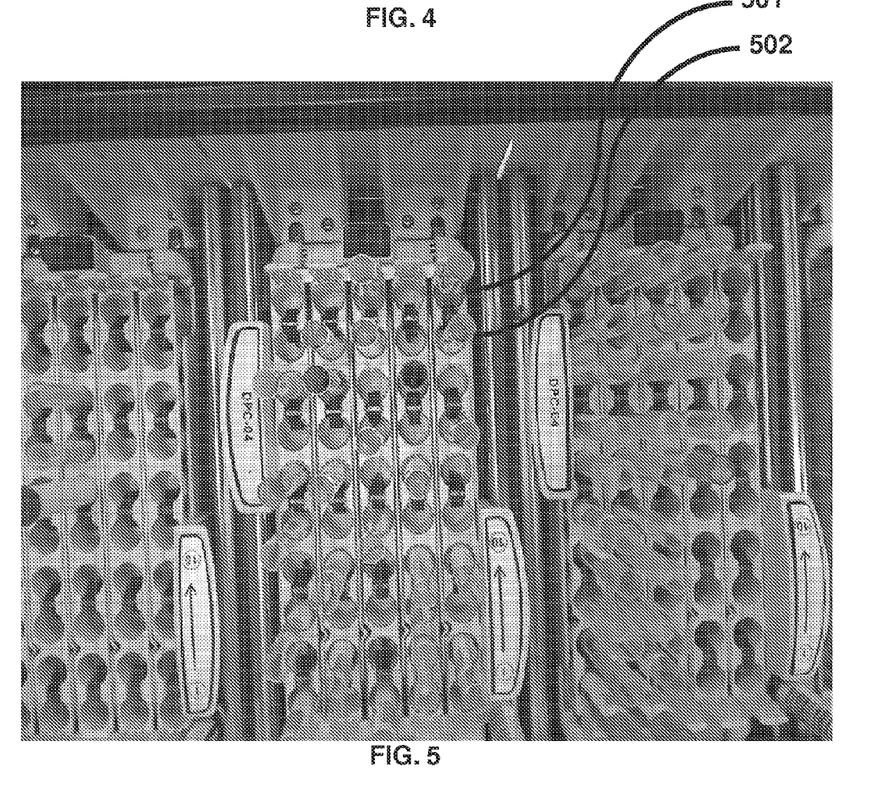
FIGS. 5, 5A and 6 illustrate steps for 3D tracking of a rack with tubes.
Figure 6:
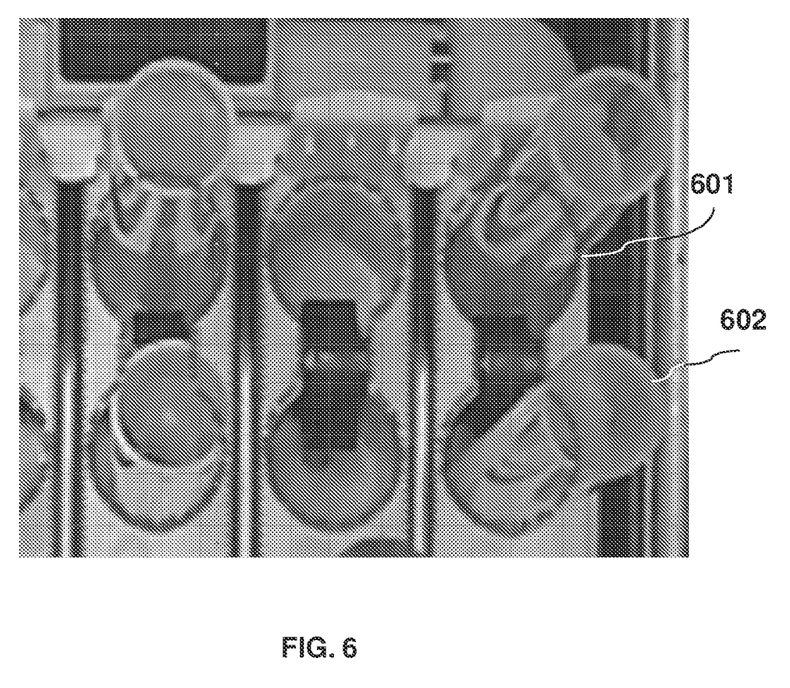

FIGS. 4-6 illustrate tracking results of one rack in two images of a stereo pair, wherein tracked 3D edges are projected to the images and overlaid. FIG. 4 illustrates an edge model 400 of one rack along a z and x axis with relative coordinates. FIG. 4 provides a detail of a position 401 in the rack 400 and shows the 8 shape of the rack viewed from above. For illustrative purposes a circle 402 illustrates a rim of a tube present in the rack.

Figure 5A:
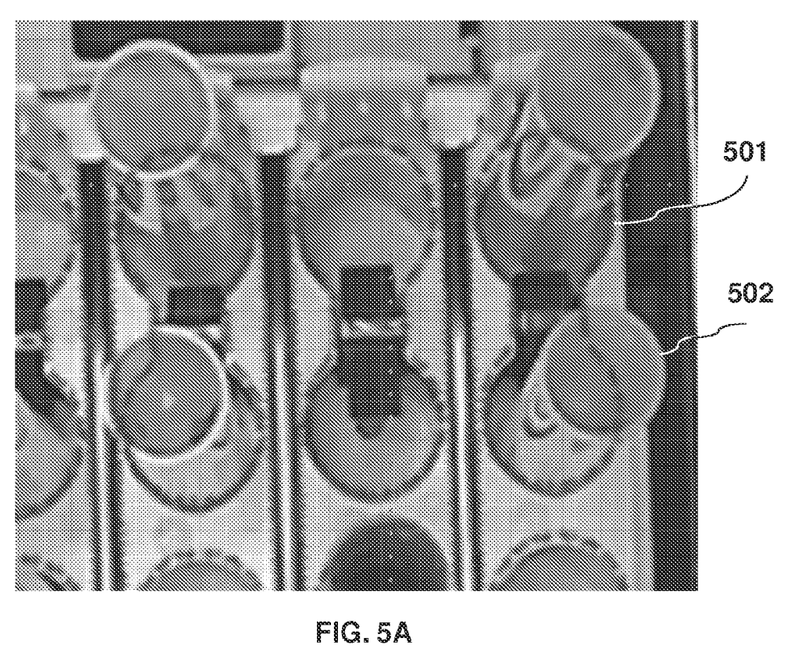

FIG. 5 illustrates tracking result in one image with tracked edges drawn (dotted lines surrounding openings enabled to hold tubes in figure) and overlaid in the image. One detail of a track position is identified as 501 and a tube in a position in 501 is identified as 502. For clarity, the details are showed enlarged in FIG. 5A again with track edges 501 drawn (dotted lines in figure) and actual tube image 502. FIG. 5A clearly shows that the angle of the camera causes the upper part of the tube to not coincide with the edges of the rack.

FIG. 6 shows the details of the same area of the rack as enlarged in FIG. 5A but taken with a camera (in this case the same camera), from a different position relative to the rack with rack edges 601 and tube 602 identified. By comparing FIG. 6 with FIG. 5A one can clearly notice the differences and the parallax created by using different camera positions.

Multi-view Homography Mapping

The top part of the rack as shown in FIGS. 5-6 is planar and as a result this plane induces a homography mapping between any two views, as is described in "[4]. Hartley, R., Zisserman, A.: Multiple View Geometry in Computer Vision. Cambridge Univ. Press (2000)." Specifically, for every scene point X on this planar surface, its imaged point in the i-th image $u_i$ can be linearly mapped to its imaged point in the j-th image $u_j$ by a 3×3 homography $H_{ij}$:

$$s \begin{bmatrix} u_j \\ v_j \\ 1 \end{bmatrix} = H_{ij} \begin{bmatrix} u_i \\ v_i \\ 1 \end{bmatrix} \quad (2)$$

where the linear mapping through homography $H_{ij}$ holds for all scene points on this planar surface, between the i-th image $I_i$ and the j-th image $I_j$, and s is a scalar specific to each pixel. This implies that for every scene point X on the planar surface one has:

$$I_i(u_i,v_i)=I_j(u_j,v_j) \quad (3)$$

This geometric relationship suggests that plane induced parallax exists between two views as described in "[4]. Hartley, R., Zisserman, A.: Multiple View Geometry in Computer Vision. Cambridge Univ. Press (2000)" and it can be utilized for detecting scene structures not on the plane.

This geometric relationship suggests that plane induced parallax exists between two views as described in "Hartley, R., Zisserman, A.: Multiple View Geometry in Computer Vision. Cambridge Univ. Press (2000)" and it can be utilized for detecting scene structures not on the plane. Parallax has been researched for moving object detection as described in "Irani, M., Anandan, P.: A unified approach to moving object detection in 2d and 3d scenes. IEEE Transactions on Pattern Analysis and Machine Intelligence 20 (1998) 577-589" and for reconstruction and recognition as described in "Shashua, A., Navab, N.: Relative affine structure: Canonical model for 3D from 2D geometry and applications. IEEE Transactions on Pattern Analysis and Machine Intelligence 18 (1996) 873-883" in computer vision. Very recently it has also been explored for x-ray image stitching in the community as described in "Wang, L., Traub, J., Weidert, S., Heining, S. M., Euler, E., Navab, N.: Parallax-free long bone x-ray image stitching. In: MICCAI (1). (2009) 173-180."

Figure 7:
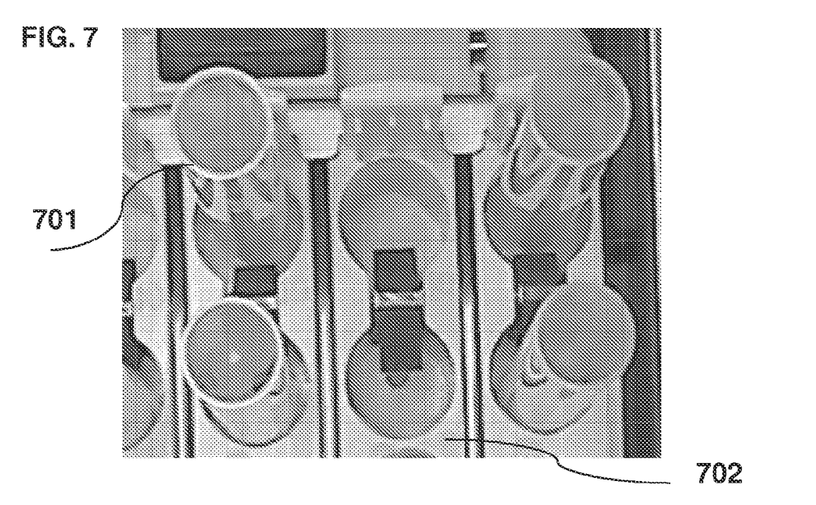
FIG. 7 illustrates a first image of a rack with tubes in accordance with an aspect of the present invention.
Figure 8:
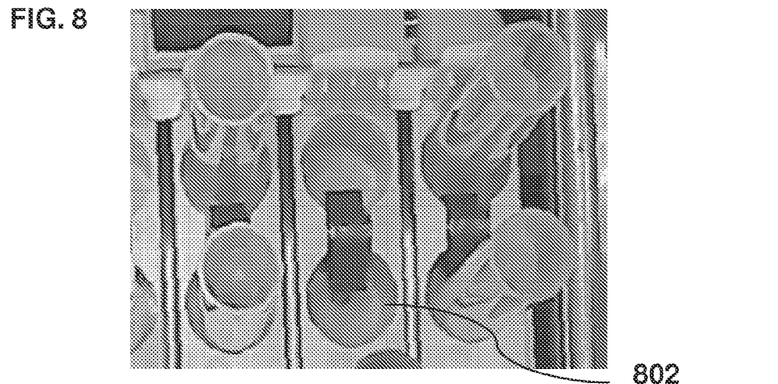
FIG. 8 illustrates a warped second image in accordance with an aspect of the present invention.
Figure 9:
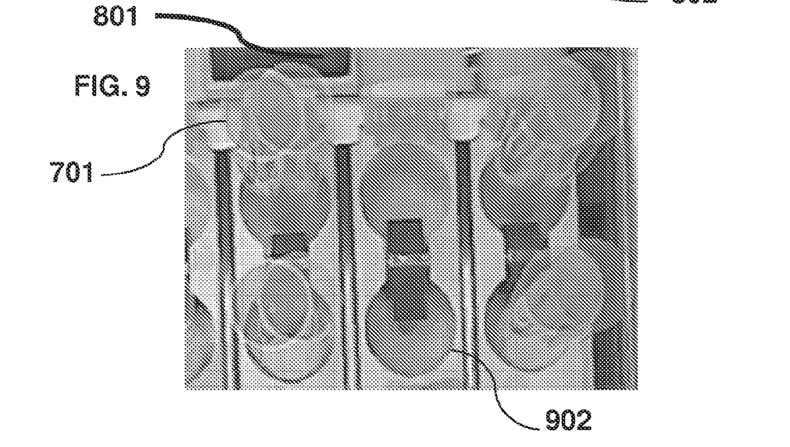
FIGS. 9 and 10 illustrate an overlay of the first and the warped image in accordance with an aspect of the present invention.

Plane induced parallax is illustrated in FIGS. 7-9 with FIG. 7 showing a detail of a first image from a first viewpoint with a tube 701 and rack edges 702. FIG. 8 is a detail of a second image from a second viewpoint warped in accordance with an aspect of the present invention via homography to the viewpoint of the first image with tube now being imaged as 801 and rack edges 802. FIG. 9 is a detail of the previous images are overlaid in accordance with an aspect of the present invention, and parallax exists for any scene point that is not on the plane. This is shown first in rack edges 902 which are in the plane and are identical for both FIGS. 7 and 8 and thus will show up as a single edge 902. However the tube edges 701 and 801 (from the same tube, but from different poses) are not in the homography plane and do not overlap.

When the two images of FIGS. 7 and 8 are overlaid, scene points on the plane (corresponding to the homography used) have identical image locations, where scene point not on the plane will be at different image locations (parallax), as shown in FIG. 9.

However, utilizing such parallax directly as in previous work is challenging. Motion estimation technique does not provide sufficient accuracy since it is based on comparing image patches and the error score for detection is also too coarse for the present application. The authors of "Shashua, A., Navab, N.: Relative affine structure: Canonical model for 3D from 2D geometry and applications. IEEE Transactions on Pattern Analysis and Machine Intelligence 18 (1996) 873-883" assume a set of true image correspondences have been given to compute the parallax geometry. As an aspect of the present invention the above difficulties have been overcome by first using 3D tracking which provides very accurate pose estimates.

To estimate homography $H_{ij}$ between the i-th image and the j-th image, one can either derive from the poses or compute directly using a few points on the planar surface.

Specifically, from equation (2) one has:

$$su_i = h_{11}u_j + h_{12}v_j + h_{13}$$
$$sv_i = h_{21}u_j + h_{22}v_j + h_{23}$$
$$s = h_{31}u_j + h_{32}v_j + h_{33}$$
(4)

Rewrite $H_{ji}$ as a vector $h=(h_{11},h_{12},h_{13},h_{21},h_{22},h_{23},h_{31},h_{32},h_{33})^T$. Substitute s and reformulate to a linear equation:

$$\begin{bmatrix} u_j & v_j & 1 & 0 & 0 & 0 & -u_ju_i & -v_ju_i & -u_i \\ 0 & 0 & 0 & u_j & v_j & 1 & -u_jv_i & -v_jv_i & -v_i \end{bmatrix} h = 0$$
(5)

When multiple points (n≥5) are represented in the above equation it becomes an over-determined linear system in the form of $$Ah = 0;$$ (6)

$$\begin{bmatrix} u_{j1} & v_{j1} & 1 & 0 & 0 & 0 & -u_{j1}u_{i1} & -v_{j1}u_{i1} & -u_{i1} \\ 0 & 0 & 0 & u_{j1} & v_{j1} & 1 & -u_{j1}v_{i1} & -v_{j1}v_{i1} & -v_{i1} \\ u_{j2} & v_{j2} & 1 & 0 & 0 & 0 & -u_{j2}u_{i2} & -v_{j2}u_{i2} & -u_{i2} \\ 0 & 0 & 0 & u_{j2} & v_{j2} & 1 & -u_{j2}v_{i2} & -v_{j2}v_{i2} & -v_{i2} \\ \cdots & \cdots & \cdots & \cdots & \cdots & \cdots & \cdots & \cdots & \cdots \\ u_{jn} & v_{jn} & 1 & 0 & 0 & 0 & -u_{jn}u_{in} & -v_{jn}u_{in} & -u_{in} \\ 0 & 0 & 0 & u_{jn} & v_{jn} & 1 & -u_{jn}v_{in} & -v_{jn}v_{in} & -v_{in} \end{bmatrix} h = 0$$

where h can be easily solved using singular value decomposition (SVD) as described in "Hartley, R., Zisserman, A.: Multiple View Geometry in Computer Vision. Cambridge Univ. Press (2000)." With accurate pose estimates from 3D tracking, one simply re-projects several points on the top plane of the rack to the images and obtains a set of corresponding points in the i-th and j-th images and use their coordinates to formulate the linear system and solve for $H_{ji}$.

Tube Detection Based on Normalized Cross-correlation

In accordance with an aspect of the present invention the plane induced parallax is used for tube detection. In particular, the j-th image is warped to the viewpoint of the i-th image using the homography $H_{ji}$ with bilinear interpolation and obtain warped image $\hat{I}_j = f_{H_{ji}}(I_j)$, where $f_{H_{ji}}$ is the warping function using homography $H_{ji}$ obtaining image $\hat{I}_j$.

From the previous discussion it is to be understood that for any scene point on the rack's top plane, its imaged point will be at the exact same image locations in $I_i$ and $\hat{I}_j$; while for any scene point not on the rack's top plane, its image point will be at different image locations (therefore causing parallax).

A cross-correlation is then computed over image pairs (e.g. $I_i$ and $\hat{I}_j = f_{H_{ji}}(I_j)$). The cross-correlation is preferably a Normalized Cross-Correlation (NCC). NCC is routinely used for stereo matching in computer vision as described in "[5]. Faugeras, O.: Three-Dimensional Computer Vision. The MIT Press (1993)" and in "[6]. Scharstein, D., Szeliski, R.: A taxonomy and evaluation of dense two-frame stereo correspondence algorithms. International Journal of Computer Vision 47 (2002) 7-42."

As an aspect of the present invention, NCC is computed over the i-th image and the j-th image warped with homography $H_{ji}$, i.e. $\hat{I}_j = f_{H_{ji}}(I_j)$. As an aspect of the present invention, only a per-pixel wise correlation value over a window between the two images needs to be computed. Specifically, NCC at pixel $(u_0, v_0)$ is given by:

$$NCC(u_0, v_0) = \frac{\left( \sum_{(u,v) \in N(u_0,v_0)} (I_i(u,v) - \bar{I}_i)(f_{H_{ji}}(I_j)(u,v) - f_{H_{ji}}^-(I_j)) \right)}{\left( \left( \sum_{(u,v) \in N(u_0,v_0)} (I_i(u,v) - \bar{I}_i)^2 \sum_{(u,v) \in N(u_0,v_0)} (f_{H_{ji}}(I_j)(u,v) - f_{H_{ji}}^-(I_j))^2 \right)^{\frac{1}{2}} \right)}$$
(7)

where $\bar{I}_i$ is the mean within a neighborhood window around $(u_0,v_0)$ in image $I_i$, $f_{H_{ji}}(I_j)$ is warped j-th image using homography $H_{ji}$, $\overline{f_{H_{ji}}(I_j)}$ is the mean within a neighborhood window of the same size around $(u_0,v_0)$ in image $\tilde{I}_j = f_{H_{ji}}(I_j)$, and $N(u_0, v_0)$ is the neighborhood around $(u_0,v_0)$. In one embodiment of the present invention a window of 11×11 pixels centered at $(u_0,v_0)$ is used.

Figure 10:
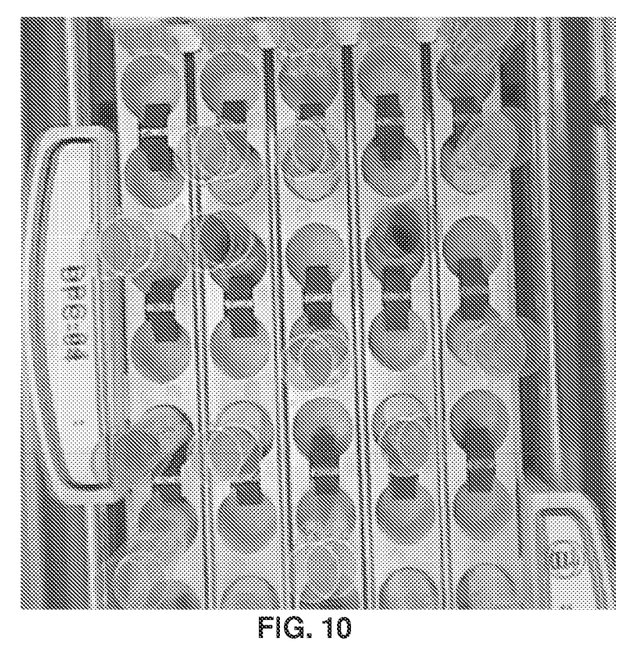
Figure 11:
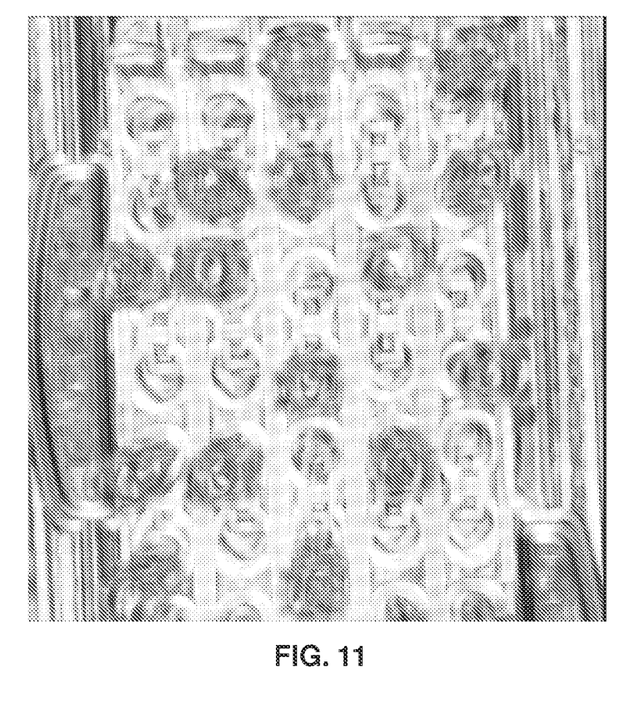
FIG. 11 illustrates dark and light patches created by a normalized cross correlation between the first image and the warped image in accordance with an aspect of the present invention.
Figure 12:
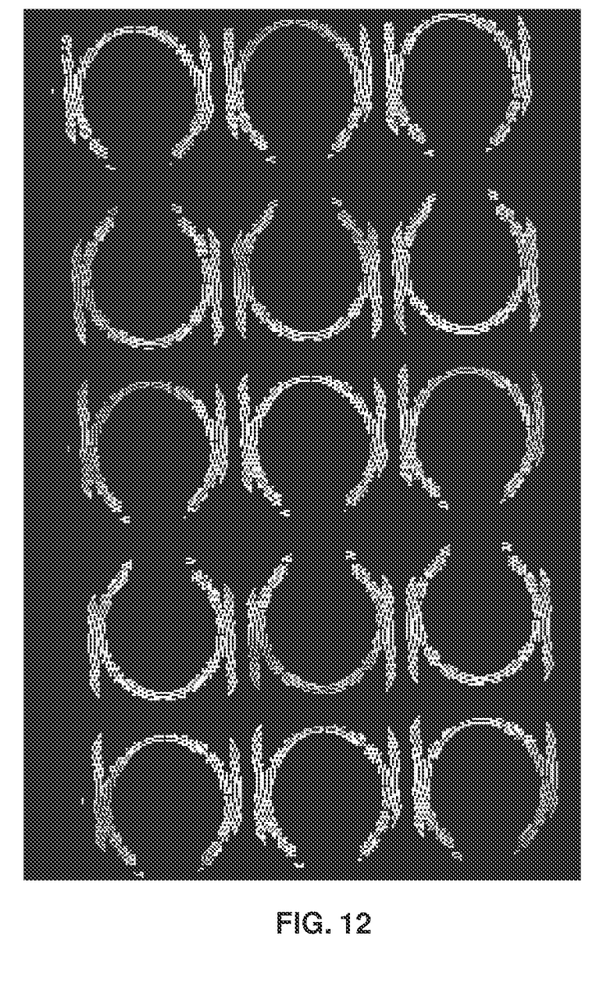
FIG. 12 illustrates a band area surrounding a rack hole for tube detection in accordance with an aspect of the present invention.

FIGS. 10-12 illustrate the correlation between the first image and the warped second image. Observe that when there is no tube at a location, high correlation value (brighter intensity) would be obtained at the plane associated with the homography. In accordance with an aspect of the present invention, one can infer whether there is a tube or not by checking the band area (see FIG. 12) surrounding a rack hole. High correlation values suggest no and low correlation values suggest yes. A decision threshold τ that can vary with the situation is used for this purpose. To avoid occlusions to other rack hole locations caused by one tube, multiple images are obtained that focus on different parts of a rack, such that a tube would not occlude other rack hole locations being analyzed. Correlation: FIG. 10 displays an overlay of the first image and the warped second image. FIG. 11 illustrates the normalized cross-correlation between the first image and the warped second image with light and dark patches. FIG. 12 illustrates a band area surrounding each rack hole for tube detection. Because the rack is tracked in 3D, image locations of holes are known.

Experimental Results

The steps as provided herein in accordance with various aspects of the present invention have been executed in scale experiments where tubes are randomly placed on the rack and good results were observed. Steps as provided herein have been applied repeatedly on different tube inventory configurations. Overall, at least 98% accuracy was observed in correctly detecting presence (or absence) of a tube.

The normalized cross-correlation images between a first image and the warped second image of different stereo pairs indicate whether a tube is detected or not. Specifically, where there is no tube in a hole in the rack, the band area has high correlation value (e.g. high intensity value as shown in bright). On the other hand, when there is a tube, parallax will exist and the band area will have low correlation value (e.g. low intensity value as shown in dark).

The detection methods provided herein in accordance with an aspect of the present invention have been implemented in C++ and tested on several robotic systems in large scale experiments. Initially we started with a high resolution Firewire camera (Point Grey Flea2 FL2G-50S5M-C at 2448× 2048 resolution) and later on relaxed to a USB web camera (Logitech C905 at 1600×1200 resolution). All experimental results reported herein are with this USB Logitech web camera. Relative pose between the camera and the robotic arm has been determined in an offline bundle adjustment procedure. A fixed threshold τ=0:875 was used in all experiments and accurate, robust, and repeatable results were observed. The herein provided methods were run repeatedly on different tube inventory configurations. A system on which the methods were implemented was tested on low lighting condition and drastic lighting variance during image capturing by pointing a flash light at the rack. Overall 98% -99% accuracy was observed in correctly deciding whether there is a tube or not in a particular location on the rack.

On a PC with 3.0 GHz CPU, 3D tracking in each image takes less than one second, and correlation for each stereo pair takes 1 to 2 seconds. It was experimentally decided to use eight images for one rack and by reusing some of these images six stereo pairs focusing on different parts of the rack were obtained. This is necessary to avoid any occlusions that one tube might cause to other hole locations.

The systems and methods provided herein are applied to determine an inventory of a plurality of objects which are tubes that are located in a rack. As explained above, determining of inventory is based on tracking the rack so that a pose of a camera with relation to the rack is known, taking at least a first and a second image from a first and a second viewpoint, respectively of the camera of the same part of a rack with objects, wherein the camera may be attached to a robotic arm. Based on the results of 3D tracking, a homography is then computed between these two images of a stereo pair. The second image is warped by this homography to the first viewpoint of the first image. A cross correlation between the first image and the warped second image is calculated. A plane induced parallax reveals a presence or an absence of an object (e.g. tube) on each hole of the rack. One can easily see that the disclosed approach can be applied to other objects that are arranged on a rack or a pallet or in some sort of regular order to detect a presence or an absence of such an object.

Figure 13:
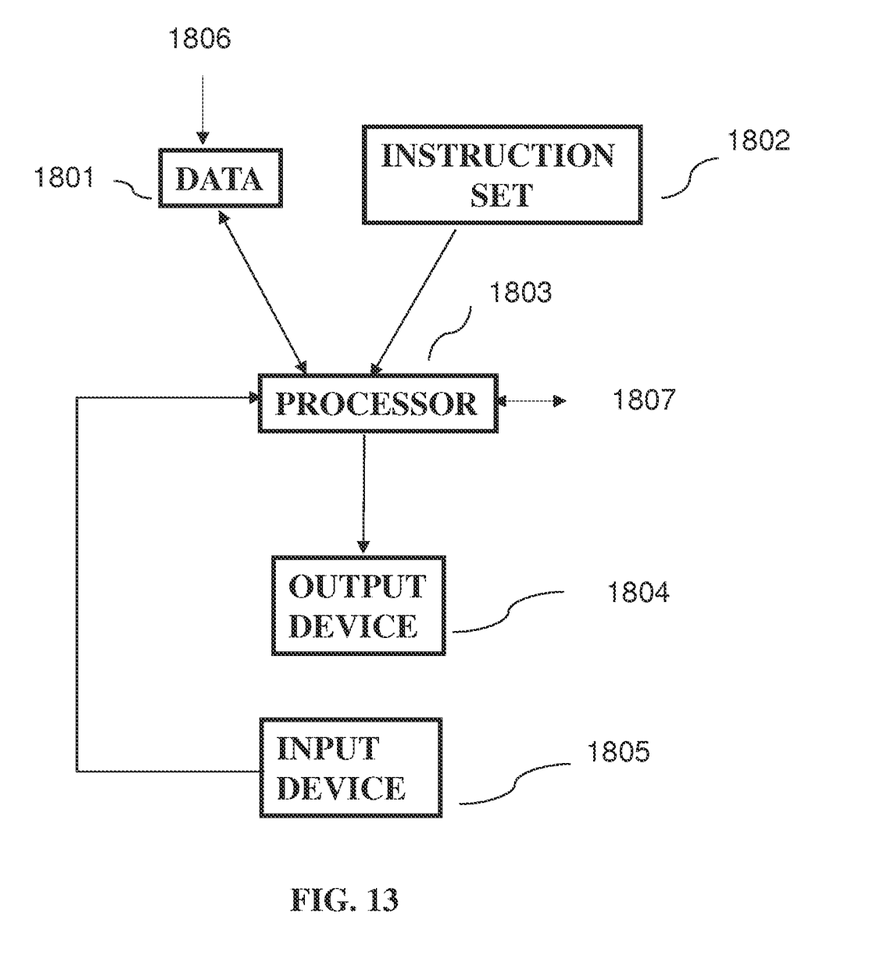
FIG. 13 illustrates a processor based system in accordance with an aspect of the present invention.

The methods as provided herein are, in one embodiment of the present invention, implemented on a system or a computer device. Thus, steps described herein are all implemented on a processor 1807, as shown in FIG. 13. A system illustrated in FIG. 13 and as provided herein is enabled for receiving, processing and generating data. The system is provided with data that can be stored on a memory 1801. Data may be obtained from a sensor such as a camera which may be attached to a robotic arm or from any other data relevant source. Data may be provided on an input 1806. Such data may be image data or positional data, or CAD data, or any other data that is helpful in a vision and display system. The processor is also provided or programmed with an instruction set or program executing the methods of the present invention that is stored on a memory 1802 and is provided to the processor 1803, which executes the instructions of 1802 to process the data from 1801. Data, such as image data or any other data provided by the processor can be outputted on an output device 1804, which may be a display to display images or data related to a tube inventory or a data storage device. The output may also provide control data to a robotic arm. The processor also has a communication channel 1807 to receive external data from a communication device and to transmit data to an external device. The system in one embodiment of the present invention has an input device 1805, which may include a keyboard, a mouse, a pointing device, one or more cameras or any other device that can generate data to be provided to processor 1803.

The processor can be dedicated or application specific hardware or circuitry. However, the processor can also be a general CPU or any other computing device that can execute the instructions of 1802. Accordingly, the system as illustrated in FIG. 13 provides a system for data processing resulting from a sensor, a camera or any other data source and is enabled to execute the steps of the methods as provided herein as an aspect of the present invention.

Figure 14:
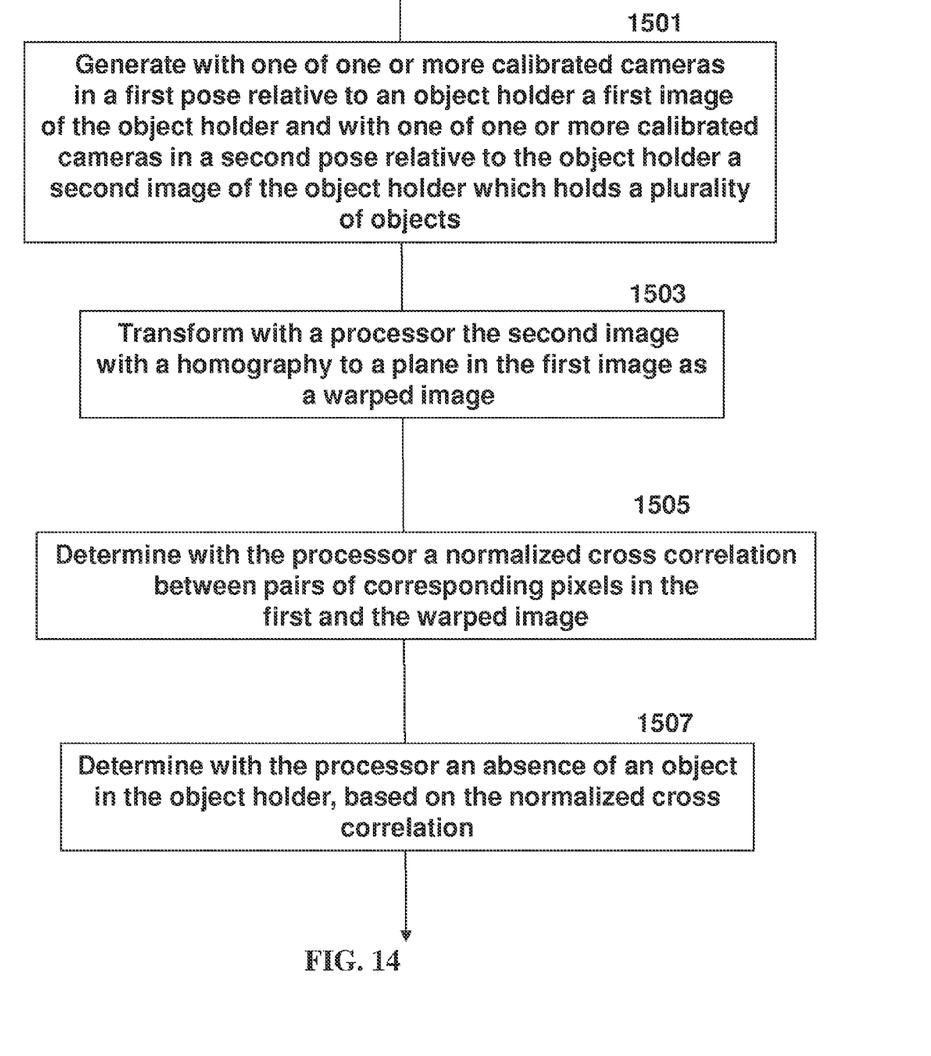
FIG. 14 illustrates steps performed by a processor based system in accordance with one or more aspects of the present invention.

Steps of a method provided in accordance with an aspect of the present invention are illustrated in FIG. 14 and include: step 1501 to generate with a calibrated camera in a first pose relative to an object holder a first image and with the calibrated camera in a second pose a second image of the object holder with a plurality of object; in step 1503 a processor transforming the second image with a homography to a plane in the first image, so that points in the first plane in the second image are transformed to those points in the first plane in the first image, the transformed second image is called a warped image; in step 1505 determine a normalized cross-correlation between pairs of corresponding pixels in the first and the warped image; and in step 1507 the processor determines an absence or presence of an object on the object holder based on the normalized cross-correlation. Thus, a system and methods have been described herein for at least multi-view stereo systems and methods for tube inventory in healthcare diagnostics.

An object holder, such as a rack for test tubes, usually has a regular pattern of holes or of defined locations to receive an object such as a tube. The absence of one or more objects such as tubes in a generally regular pattern of objects, as for instance defined by the holes in the rack, can thus be easily checked by taken the pattern generated by the cross correlation against the pattern generated by the rack itself.

It is to be understood that the present invention may be implemented in various forms of hardware, software, firmware, special purpose processors, or a combination thereof In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The following references provide background information generally related to the present invention and are hereby incorporated by reference: [1]. Lepetit, V., Fua, P.: Monocular model-based 3D tracking of rigid objects: A survey. Foundations and Trends in Computer Graphics and Vision 1 (2005); [2]. Drummond. T., Cipolla, R.: Real-time visual tracking of complex structures. IEEE Transactions on Pattern Analysis and Machine Intelligence 24 (2002) 932-946; [3]. Li, G., Tsin, Y., Genc, Y.: Exploiting occluding contours for real-time 3D tracking: A unified approach. In: Proc. IEEE International Conference on Computer Vision. (2007); [4]. Hartley, R., Zisserman, A.: Multiple View Geometry in Computer Vision. Cambridge Univ. Press (2000); [5]. Faugeras, O.: Three-Dimensional Computer Vision. The MIT Press (1993); and [6]. Scharstein, D., Szeliski, R.: A taxonomy and evaluation of dense two-frame stereo correspondence algorithms. International Journal of Computer Vision 47 (2002) 7-42.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for determining with one or more calibrated cameras an inventory of a plurality of objects located in an object holder, each object having a first portion located in a first plane in space and a second portion not located in the first plane, comprising:
generating by the one or more calibrated cameras a first image of the plurality of objects representing a first pose relative to the object holder and a second image of the plurality of objects representing a second pose relative to the object holder;
a processor transforming the second image to a warped image with a homography that maps each scene point in the first plane in the second image to a corresponding scene point in the first plane of the first image;
the processor generating a cross-correlation between the first image and the warped image; and
the processor determining an absence or a presence of an object at a location of the object holder,
wherein the cross-correlation of a pixel $(u_0, v_0)$ in an image $I_j$ is a normalized cross-correlation (NCC) evaluated by the processor from an expression $$NCC(u_0, v_0) = \frac{\sum_{(u,v)\in N(u_0,v_0)} (I_i(u,v) - \bar{I}_i)(f_{H_{ji}}(I_j)(u,v) - f_{H_{ji}}^-(I_j))}{\left(\sum_{(u,v)\in N(u_0,v_0)} (I_i(u,v) - \bar{I}_i)^2 \sum_{(u,v)\in N(u_0,v_0)} (f_{H_{ji}}(I_j)(u,v) - f_{H_{ji}}^-(I_j))^2\right)^{\frac{1}{2}}},$$

wherein $\bar{I}_i$ is a mean within a neighborhood window around $(u_0, v_0)$ in image $I_j$,
$f_{H_{ji}}(I_j)(u,v)$ is a warped j-th image using a homography $H_{ji}$,
$f_{H_{ji}}^-(I_j)$ is a mean within a neighborhood window in image $f_{H_{ji}}(I_j)(u,v)$ of a same size as around $(u_0, v_0)$, and
$N(u_0, v_0)$ is a neighborhood around $(u_0, v_0)$.

2. The method of claim 1, wherein the object is a sample tube and the object holder is a tube rack.

3. The method of claim 1, wherein the one or more calibrated cameras are attached to a robotic arm.

4. The method of claim 2, wherein the first and second pose are determined by edge-based three-dimensional tracking of the rack relative to the one or more calibrated cameras.

5. The method of claim 4, wherein a relative pose between the rack and the one or more calibrated cameras is expressed as: $su_i=K(R_iX+T_i)$, wherein $X=(X,Y,Z)^T$ is any scene point on the rack, $u=(u,v,1)^T$ is its image point represented in homogeneous coordinates, K is an internal calibration matrix, s is a scalar, and $R_i$ and $T_i$ are rotation and translation, respectively, for the i-th image.

6. The method of claim 1, wherein the homography is determined from the first and the second pose of one of the one or more calibrated cameras relative to the object holder.

7. The method of claim 1, further comprising:
tracking a position of the object holder relative to the one or more cameras by applying a computer-aided-design (CAD) model of the object holder.

8. The method of claim 2, wherein the first plane is the rack's top plane.

9. The method of claim 1, further comprising:
the processor comparing the cross-correlation with a corresponding view of a computer-aided-design (CAD) model of the object holder.

10. A system to determine with a calibrated camera an inventory of a plurality of objects located in an object holder, each object having a first portion located in a first plane in space and a second portion not located in the first plane, comprising:
a memory to store data including instructions;
a processor enabled to execute instructions to perform the steps:

determining a first and a second pose of the calibrated camera relative to the object holder;

receiving from the calibrated camera a first image data of the plurality of objects with the calibrated camera in the first pose and a second image of the plurality of objects with the calibrated camera in the second pose;

transforming the second image to a warped image with a homography that maps each scene point in the first plane in the second image to a corresponding scene point in the first plane of the first image;

generating a cross-correlation between the first image and the warped image; and determining an absence or a presence of an object at a location of the object holder, wherein the cross-correlation of a pixel $(u_0, v_0)$ in an image $I_j$ is a normalized cross-correlation (NCC) evaluated by the processor from an expression $$NCC(u_0, v_0) = \frac{\sum_{(u,v) \in N(u_0,v_0)} (I_i(u, v) - \bar{I}_i)(f_{H_{ji}}(I_j)(u, v) - f_{H_{ji}}^{-}(I_j))}{\left(\sum_{(u,v) \in N(u_0,v_0)} (I_i(u, v) - \bar{I}_i)^2 \sum_{(u,v) \in N(u_0,v_0)} (f_{H_{ji}}(I_j)(u, v) - f_{H_{ji}}^{-}(I_j))^2\right)^{\frac{1}{2}}},$$

wherein $\bar{I}_i$ is a mean within a neighborhood window around $(u_0, v_0)$ in image $I_j$, $f_{H_{ji}}(I_j)(u,v)$ is a warped j-th image using a homography $H_{ij}$, $f_{H_{ji}}^{-}(I_j)$ is a mean within a neighborhood window in image $f_{H_{ji}}(I_j)(u,v)$ of a same size as around $(u_0, v_0)$, and $N(u_0, v_0)$ is a neighborhood around $(u_0, v_0)$.

11. The system of claim 10, wherein the object is a sample tube and the object holder is a tube rack.

12. The system of claim 10, wherein the calibrated camera is attached to a robotic arm.

13. The system of claim 11, wherein the first and second pose are determined by edge-based three-dimensional tracking of the rack relative to the calibrated camera.

14. The system of claim 13, wherein a relative pose between the rack and the calibrated camera is expressed as: $su_i = K(R_i X + T_i)$, wherein $X = (X,Y,Z)^T$ is any scene point on the rack, $u = (u,v,1)^T$ is its image point represented in homogeneous coordinates, K is an internal calibration matrix, s is a scalar, and $R_i$ and $T_i$ are rotation and translation, respectively, for the i-th image.

15. The system of claim 10, wherein the homography is determined from the first and the second pose of the calibrated camera relative to the object holder.

16. The system of claim 10, wherein the homography is determined from predetermined points in the first plane.

17. The system of claim 11, wherein the first plane is the rack's top plane.

18. The system of claim 10, the processor further enabled to perform:

comparing the normalized cross-correlation with a corresponding view of a computer-aided-design (CAD) model of the object holder.

* * * * *